(12) United States Patent
Nikolenko et al.

(10) Patent No.: US 11,455,495 B2
(45) Date of Patent: Sep. 27, 2022

(54) SYSTEM AND METHOD FOR VISUAL RECOGNITION USING SYNTHETIC TRAINING DATA

(71) Applicant: SYNTHESIS AI, INC., San Francisco, CA (US)

(72) Inventors: Sergey Nikolenko, Saint Petersburg (RU); Yashar Behzadi, Orinda, CA (US)

(73) Assignee: SYNTHESIS AI, INC., San Francisco, CA (US)

( * ) Notice: Subject to any disclaimer, the term of this patent is extended or adjusted under 35 U.S.C. 154(b) by 188 days.

(21) Appl. No.: 16/839,059

(22) Filed: Apr. 2, 2020

(65) Prior Publication Data

US 2020/0320345 A1    Oct. 8, 2020

Related U.S. Application Data

(60) Provisional application No. 62/827,855, filed on Apr. 2, 2019.

(51) Int. Cl.
*G06K 9/62*    (2022.01)
*G06N 3/08*    (2006.01)
*G06N 3/04*    (2006.01)
*G06N 20/00*   (2019.01)

(52) U.S. Cl.
CPC ......... *G06K 9/6257* (2013.01); *G06K 9/6256* (2013.01); *G06K 9/6262* (2013.01); *G06K 9/6264* (2013.01); *G06N 3/0445* (2013.01); *G06N 3/08* (2013.01); *G06N 20/00* (2019.01)

(58) Field of Classification Search
CPC .. G06K 9/6257; G06K 9/6256; G06K 9/6264; G06K 9/6262; G06K 9/6271; G06N 3/08; G06N 3/0445; G06N 20/00; G06N 3/0472; G06N 3/0454; G06T 7/11
USPC ........................................................ 382/159
See application file for complete search history.

(56) References Cited

U.S. PATENT DOCUMENTS

| | | | |
|---|---|---|---|
| 10,198,654 B2 * | 2/2019 | Wang | .......................... G06T 7/11 |
| 10,592,386 B2 | 3/2020 | Walters et al. | |
| 11,210,144 B2 | 12/2021 | Goodsitt et al. | |
| 2016/0299685 A1 * | 10/2016 | Zhai | .................... G06F 3/04886 |
| 2018/0075581 A1 | 3/2018 | Shi et al. | |
| 2018/0144214 A1 | 5/2018 | Hsieh et al. | |

(Continued)

OTHER PUBLICATIONS

Hoffman, "CyCADA: Cycle-Consistent Adversarial Domain Adaptation" Dec. 29, 2017 (Year: 2017).

(Continued)

*Primary Examiner* — Juan A Torres
(74) *Attorney, Agent, or Firm* — Dana Legal Services; Jubin Dana

(57) ABSTRACT

A system and method are disclosed for training a model using a training dataset. The training dataset can include only real data, only synthetic data, or any combination of synthetic data and real data. The various aspects of the invention include generation of data that is used to supplement or augment real data. Labels or attributes can be automatically added to the data as it is generated. The data can be generated using seed data. The data can be generated using synthetic data. The data can be generated from any source, including the user's thoughts or memory. Using the training dataset, various domain adaptation models can be trained.

19 Claims, 8 Drawing Sheets

(56) References Cited

U.S. PATENT DOCUMENTS

| | | | |
|---|---|---|---|
| 2018/0218284 A1 | 8/2018 | Jawahar et al. | |
| 2018/0260793 A1 | 9/2018 | Li et al. | |
| 2018/0300540 A1* | 10/2018 | Swisher | G06N 3/08 |
| 2019/0130218 A1 | 5/2019 | Albright et al. | |
| 2019/0156151 A1 | 5/2019 | Wrenninge et al. | |
| 2019/0197207 A1* | 6/2019 | Meinert | G06F 30/17 |
| 2019/0197358 A1 | 6/2019 | Madani et al. | |
| 2019/0244060 A1 | 8/2019 | Dundar et al. | |
| 2019/0251397 A1 | 8/2019 | Tremblay et al. | |
| 2019/0286073 A1 | 9/2019 | Hosseini-Asl et al. | |
| 2019/0286942 A1 | 9/2019 | Abhiram et al. | |
| 2019/0295530 A1 | 9/2019 | Hosseini-Asl et al. | |
| 2020/0097742 A1* | 3/2020 | Ratnesh Kumar | G06N 3/0481 |
| 2020/0114506 A1* | 4/2020 | Toshev | B25J 9/1697 |
| 2020/0190957 A1* | 6/2020 | Madasu | E21B 44/00 |
| 2020/0272812 A1 | 8/2020 | Wang et al. | |
| 2021/0081698 A1* | 3/2021 | Lindeman | G06T 7/70 |
| 2021/0192270 A1* | 6/2021 | Swisher | G06K 9/6215 |
| 2021/0279869 A1* | 9/2021 | Soni | G16H 30/40 |
| 2021/0383242 A1 | 12/2021 | Ostyakov et al. | |

OTHER PUBLICATIONS

Zhu, "Unpaired Image-to-Image Translation using Cycle-Consistent Adversarial Netoworks," ICCV 2017 (Year: 2017).

* cited by examiner 300  302  304

SYSTEM AND METHOD FOR VISUAL RECOGNITION USING SYNTHETIC TRAINING DATA

CROSS REFERENCE TO RELATED APPLICATION

This application claims the benefit of U.S. Provisional Application No. 62/827,855 titled SYSTEM AND METHOD FOR VISUAL RECOGNITION USING SYNTHETIC TRAINING DATA filed on Apr. 2, 2019, the entire disclosure of which is incorporated herein by reference.

FIELD OF THE INVENTION

The invention is in the field of computer systems and, more specifically, related to training machine learning systems for visual recognition using synthetic data.

BACKGROUND

Known systems for performing specific tasks based on analysis of images are typically trained over a period of time. For example, an Artificial Intelligence System (AIS) is trained to recognize an object or a subject within an image. AISs are trained using training data. Currently, known methods of training AISs include using captured data that is labeled or tagged. However, labeling captured data in quantities sufficient to train an AIS or any similar system can take a long time. Furthermore, to create an accurate and inclusive system, it is necessary to capture a range of images that include the subject and represent the full diversity associated with the subject; this diversity is needed to train the system. The current approach is inefficient for generating the training data needed to train the system or AIS. Therefore, what is needed is a system and method that generates a large volume of diverse training data, which can be used to train a system over a short period of time while representing a high standard of diversity of the subject.

SUMMARY OF THE INVENTION

The invention discloses a system and method for generating training data for training a recognition system to recognize a subject in a short period of time using training data. The various aspects of the invention include generation of robust datasets using real images that are then supplemented or augmented with synthetic data. Synthetic data is artificially generated data that mimics real-world sensory input. As the synthetic data is generated, labels are used to provide accurate information as part of the dataset that is used for training the system. This creates a robust, diverse, and extensive dataset that will allow development and training of the system in a significantly more cost effective and time sensitive manner.

BRIEF DESCRIPTION OF THE DRAWINGS

In order to more fully understand the aspects and embodiments of the invention, reference is made to the accompanying drawings. Understanding that these drawings are not to be considered limitations in the scope of the invention, the presently described aspects and embodiments and the presently understood best mode of the invention are described with additional detail through use of the accompanying drawings, in which like numbers represent the same or similar elements.

DETAILED DESCRIPTION

Figure 1:
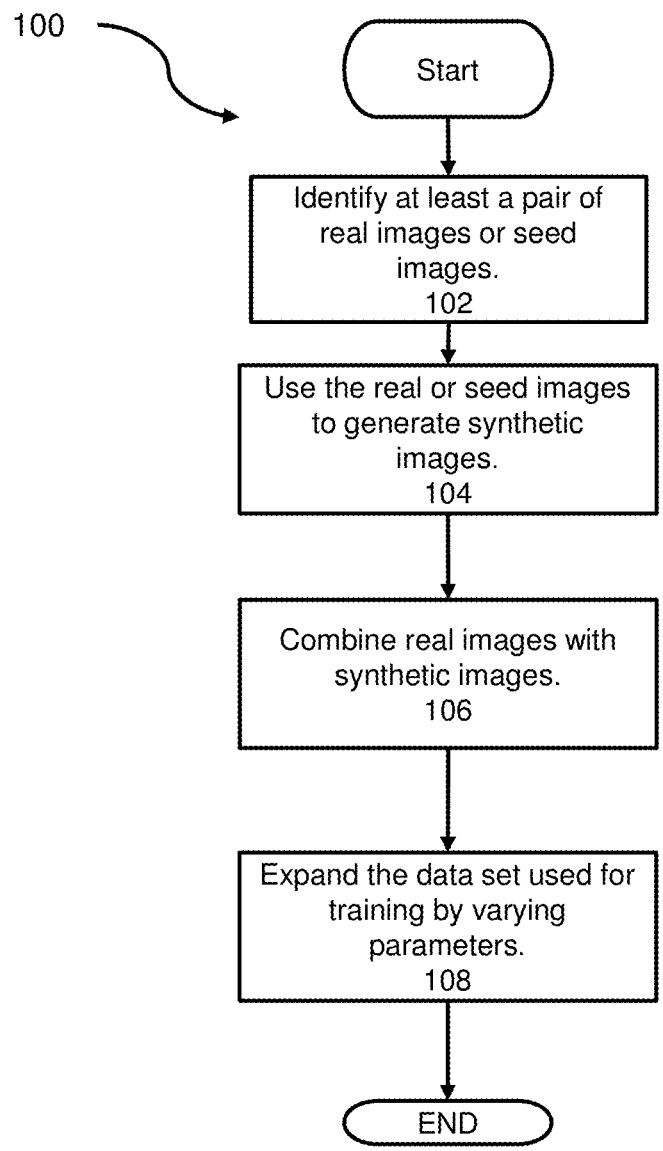
FIG. 1 shows a process for generating synthetic data in accordance with the various aspects and embodiments of the invention.

To the extent that the terms "including", "includes", "having", "has", "with", or variants thereof are used in either the detailed description or the claims, such terms are intended to be inclusive in a similar manner to the term "comprising".

The ranges of values provided herein do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In accordance with the various aspects and embodiments of the invention, "seed data" and "captured data" are used in relation to data that is real data. The real data may come from any source, including video, real dynamic images and real static images. In accordance with one aspect of the invention, real data includes real objects in any setting or environment, including native or natural environment or unnatural environment. For example, a cow is naturally found outdoors in a field or pasture. The same cow may also be standing in a living room next to a table, which is an unnatural environment for the cow. In accordance with the various aspects and embodiments of the invention, "synthetic image" and "synthetic data" refer to generated data or generated images, which can be produced by CGI. A "synthetic dataset" is a dataset that includes only synthetic data; a synthetic dataset is used for/in model training. In accordance with the various aspects and embodiments of the invention, a "hybrid dataset" is a dataset that includes both synthetic data and real data.

In accordance with the various aspects of the invention, training datasets are generated and the system is trained using the training datasets. A training dataset is developed from seed data and, in accordance with one aspect of the invention, includes synthetic data. Synthetic data includes artificial data that replicates or mimics real world sensory images. In accordance with an aspect of the invention, new synthetic data can be developed using existing synthetic data to create datasets, which may be synthetic dataset or hybrid datasets.

In accordance with the various aspects and embodiments of the invention, the synthetic data is generated using either Computer Generated Imagery (CGI), generative machine learning models, or a combination of both approaches. In accordance with the various aspects of the invention, the data that makes up the dataset, which is used for training the system, is also labeled as part of the dataset generation, i.e., augmented with class labels, object detection bounding boxes, segmentation masks, depth values, or other labels. Thus, supplementing or augmenting real data with synthetic data to develop training datasets allows for scaling, diversity, and accuracy in the training datasets for application in many different fields of use and application in many different areas. In accordance with the various aspects and embodiments of the invention, the training datasets can be used in any number of applications, including visual or face recognition, autonomous vehicles, satellite imagery, drone imagery, gesture recognition, navigation, interior mapping, medical application and imagery, retail spaces, gaze estimation, robotics and control systems, animal agriculture, aquaculture, security systems, mobile or personal devices that perform recognition tasks (such as recognizing objects in images or landmarks on objects), personal shopping, etc. The training datasets developed according to the various aspects of the invention increase performance and efficiency of training the system.

In accordance with the various aspects of the invention, improved training of machine learning models is achieved using supplementing of real data with the synthetic dataset. This improves training of machine learning models for computer vision tasks, including, but not limited to, image classification, object detection, image segmentation, and scene understanding.

Referring now to FIG. 1, in accordance with an aspect of the invention, the process 100 for generating training data is shown. At step 102, at least a pair of seed images are identified. The seed images include the subject that is the focus for training the model. For example, in accordance with the various aspects and embodiments of the invention, the subject is visual recognition for facial analysis. The seed data includes faces. With the seed data including the subject, the seed data is used to generate the synthetic data as outline herein. In accordance with an aspect of the invention, the synthetic data is generated using computer graphics to prepare artificial imagery with objects similar to the objects present in the seed data. In accordance with an aspect of the invention the synthetic data supplements neural network training by adding the synthetic data produced to the seed data to create a hybrid dataset.

For example, if the system does visual recognition, then the subject may be faces represented in the seed data: put another way, the seed data would include images of faces. In accordance with the various aspects and embodiments of the invention, at step 104, the seed data is used to generate a diverse set of synthetic data representing faces. Using contemporary rendering techniques combined with generative deep learning models, a pair of seed images (seed data) are used to generate synthetic images. In accordance with some aspects of the invention, the synthetic data is produced from a childhood memory of the artist, which is the seed data, with no reference to real images. Thus, the scope of the invention is not limited by the source of the seed data that the user or artist utilizes to create (or generate) the synthetic data.

In accordance with an aspect of the invention, the synthetic images represent a series of snapshots taken at different stages of a morphing process. This results in creating a large number of synthetic images that mimic the subject.

At step 106, the system generates a training dataset. In accordance with an aspect of the invention, the system combines the created synthetic images with real images to produce the training dataset. In this example, the training dataset is a hybrid dataset that includes both real images and synthetic images, wherein a face is the subject of the image in accordance with the various aspects of the invention. In accordance with an aspect of the invention, the system generates the training dataset using purely synthetic image, with no real data. In this example, the training dataset is a synthetic dataset that is used in the training process and no real images are used in the training process.

At step 108, the training dataset is expanded by changing various parameters, such as camera angle, background, lighting environment, facial features, etc. As synthetic images are generated, parameters associated with each synthetic image can be varied. There is no limit to the number of parameters of each synthetic image that can be altered. For example, camera attributes, which are used in generating each synthetic image, can be varied. Camera attributes include at least image modality (optical, IR, multispectral, etc.), resolution, field of view, capture angle, distance from camera, ISO, white balance, exposure, hue, and saturation. Other parameters that can be altered include environmental parameters. Environmental parameters include at least: lighting type (e.g. outdoor lighting, time of day, indoor lighting, LED lighting, etc.), lighting source, lighting position, lighting intensity, background content, surface properties, etc. Other parameters that can be identified, labeled and altered include: scene complexity based on the number of objects in the scene, the type of objects in the scene, position of objects in the scene relative to other objects, obstruction of the subject object and other objects, static objects in the scene vs dynamic objects in the scene that change position from one moment to another moment in time. All of the parameters are part of each data instance that make up the training dataset and the parameters are labeled as part of generating the synthetic data.

Thus, the generated training dataset includes a number of facial images within the bounds of natural possibilities for the subject that is the focus for training the system. The synthetic data streamlines the process of developing training datasets and vastly expands the size of the available training datasets that can be used to train the system.

Figure 2A:
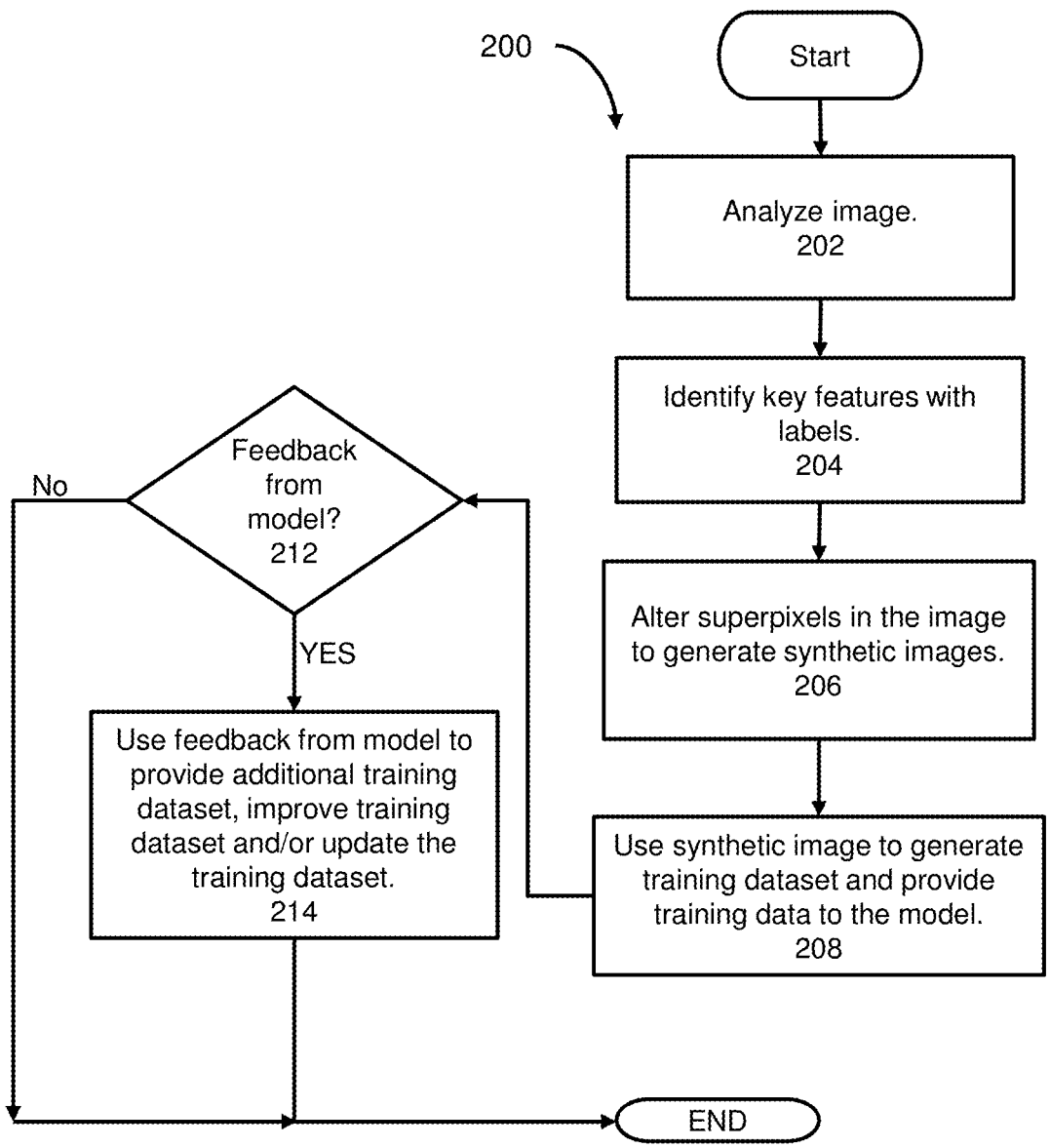
FIG. 2A shows a process for analyzing and providing feedback in accordance with the various aspects and embodiments of the invention.

Referring now to FIG. 2A, a process 200 is shown in accordance with the various aspects and embodiments of the invention for improving synthetic data used for training machine learning models with generative models. The process 200 includes analyzing seed images at step 202. The seed images are analyzed to segment the image to allow the subject to be identified within the seed image with respect to the remainder of the seed image. In accordance with some aspects and embodiments of the invention, the real image is processed to generate or create a rasterized image. In accordance with various aspects of the invention, object recognition with an image uses segmentation and relies upon tessellation of an image into superpixels. In accordance with various aspects and embodiment of the invention, the rasterized image includes superpixels, which represent a grouping of pixels that perceptually belong together and are better aligned with intensity edges than a rectangular patch.

In accordance with some aspects of the invention, each superpixel in the rasterized image can be altered or changed to generate a very diverse range of alterable parameters that make up synthetic images. The synthetic images (synthetic data) include pixel-precise labelling to allow object detection, segmentation, key feature identification and labeling, and specific feature identification and labeling. In accordance with various aspects and embodiments of the invention, subject identification within the data (or image) includes precise labeling of a range of or a set of pixels that fall within the boundaries defined by the subject of the data or image. Thus, the system can precisely label each pixel associated with the subject or the feature identified.

At step 204 key features in the synthetic image are identified and labeled. in accordance with one aspect of the invention, the labels can be the same labels used on the seed image. There are many different key features that can be selected and labeled, a few examples of which are outlined herein. For example and in accordance with an aspect of the invention, key facial features that can be labelled include eyes, nose, and mouth. Each key facial feature that is labelled will include a range of pixels in the pixel image.

At step 206, in accordance with an aspect of the invention, superpixels are altered in the image. In accordance with one aspect of the invention, the image may be a real image that is rasterized. In accordance with another aspect of the invention, the image may be a synthetic image. The superpixels are altered to generate a diverse range of synthetic images based on the key features that were selected. The system has a high degree of control over the superpixels and, thus, a high degree of control over the parameters that can be varied to generate the synthetic images. In accordance with one aspect of the invention, the synthetic data is generated by alterations or variations in or to the seed data to generate synthetic images. In accordance with some aspects of the invention, alterations can be made to existing synthetic data to generate new synthetic data from existing synthetic data. In accordance with one aspect of the invention, alteration are made to superpixels. In accordance with one aspect of the invention, alteration are made to segments. As noted, labels can be used with the generated synthetic data.

In accordance with the various aspects of the invention, at step 208, the synthetic data is used to supplement, enhance or augment the seed data or real data, which are images in the current example. This results in a training dataset. The training dataset includes a wide range of diversity that is quickly and easily generated. In accordance with some aspects of the invention, the training dataset is made up of real data. In accordance with one aspect of the invention, the training dataset is made up of real data and synthetic data resulting in a hybrid dataset. The training dataset is provided to the system or model and used to train the system or model or any AIS. For example and in accordance with some aspects of the invention, Generative Adversarial Networks (GANs) are used to generate or enhance synthetic data.

In accordance with one aspect of the invention, once the model is trained, then the trained model can be used on new data (new images), which can include synthetic data, real data, or a combination thereof (such as a hybrid dataset). This allows the system to have a feedback loop. The feedback loop would allow the system to analyze images using trained model. The analysis performed by the trained model on additional data would be analyzed, as noted below. The system uses the analysis to gather additional information. The system can use the additional information to infer or generate the appropriate labels or attributes for the subject in the newly generated data. In accordance with some aspects of the invention, the appropriate labels or attributes used may be selected from an existing set of labels. In accordance with some aspects of the invention, the appropriate labels or attributes used may be new labels that are created based on analysis of the feedback, as outlined below.

At step 212, if there is feedback from the system or the model, then at step 214 the feedback is used to provide additional training datasets, improved training datasets, and/or update the training dataset.

In accordance with the various aspects of the invention, using the training data, the system can construct a synthetic dataset for facial recognition systems. Various facial features can be generated and modeled to further calibrate and train the system at a detailed level. For example and in accordance with the various aspects of the invention, any combination of age, gender, race, or any physical attribute is modeled for training the system. For example, the feedback from the system maybe that at least two images that are difficult to differentiate or label. While the example is provided and discussed with two images, any number of images may be difficult for the system to differentiate; these images become the seed images for generating a new training dataset to help train the system to be able to differentiate between the two seed images.

The feedback is analyzed and new training datasets are generated based on the two seed images. As new training datasets are used to further train the model, the model is further improved and/or enhanced. As the model is trained further, the model can be used on images that are difficult to differentiate and/or label. This will result in additional feedback based on using the model after additional training. The new training dataset is used to help train the system to differentiate between the two seed In accordance with one aspect of the invention, the new training dataset, which is used to help train for differentiation between the similar seed images, is generated automatically. In accordance with one aspect of the invention, the new training dataset, which is used to help train for differentiation between the similar seed images, is generated manually by a user. In accordance with one aspect of the invention, the new training dataset, which is used to help train for differentiation between these similar images, is generated remotely using a combination of user input and auto-generation. In these various aspects of the invention, the labeling is auto-generated. In these various aspects of the invention, the labeling is semi-auto generated. In these various aspects of the invention, the labeling is manually provided by a user.

Figure 2B:
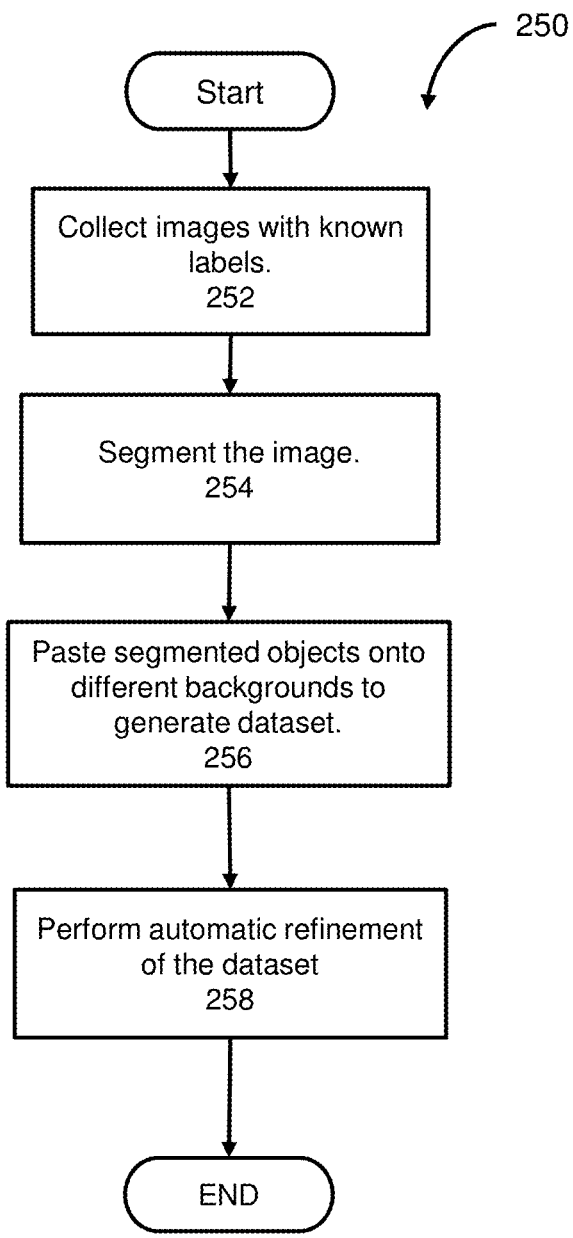
FIG. 2B shows a process for segmenting real data to generate synthetic data in accordance with the various aspects and embodiments of the invention.

Referring now to FIG. 2B, a process 250 is shown for segmenting real images to generate synthetic images. In accordance with the various aspects of the invention, improved training of machine learning models is achieved by supplementing real data with synthetic data. In accordance with the various aspects of the invention, synthetic data generation is achieved by applying image segmentation models to real data and subsequently pasting segmentation results onto different images. In accordance with some aspects of the invention, the resulting image can be automatically refined. In accordance with some aspects of the invention, the resulting image is not automatically refined and can be manually refined. At step 252 images are collected or captured. The images include at least one object that is the subject or target of the training for the model. In accordance with some aspects of the invention, real images, which include known labels, are collected or used. The real images include objects. The individual objects in the real image are identified. In accordance with various aspects of the invention, synthetic images with known labels can be collected and segmented.

At step 254, the image is segmented. The images are segmented with a known model for image segmentation; any segmentation model can be used, including classical computer vision models such as GrabCut or deep learning based models such as Mask-RCNN or DeepMask. The segmented image includes at least one segment with the object that has a known label. As a result and in accordance with some aspects of the invention, segmented objects with known labels, which are derived from real data, are produced. In accordance with some aspects of the invention, segmented objects with known labels are derived from synthetic data. At step 256, segmented objects are pasted onto different backgrounds to produce an unrefined synthetic datasets. In accordance with the various aspects of the invention, the background can be synthetic. For example, produced by computer graphics. In accordance with the various aspects of the invention, the background can be real or derived from a real image. The background can come from unlabeled datasets because they do not have to contain the objects in question; the objects, which are labelled, will be pasted onto the background through a cut-and-paste process. The system's use of unlabeled datasets simplifies data collection for training of a model and greatly expands the amount of data available for the process. As a result of this step, a large synthetic dataset is generated that includes known real objects pasted onto different backgrounds, which provides the necessary range of diversity.

Direct cut-and-paste onto a different background, even if the segmentation mask is perfect, may not result in a realistic image. Thus, the synthetic dataset can still be further improved for training AIS, especially when the resulting image is not realistic. Moreover, artifacts on the border of the pasted object may make it significantly easier to find for an AIS, and this reduces the value of the synthetic dataset.

At step 258, the system performs automatic refinement of the resulting synthetic dataset, which can be used as the training dataset. This is a transformation that makes the images (images that result from the cut-and-paste process) more realistic while preserving the known labels associated with the object. The refinement is outlined with respect to FIG. 4, wherein a hybrid neural network serves as a refiner to enhance the training dataset. As noted above with respect to the various aspects of the invention, the training dataset may be a real training dataset, synthetic training dataset, or a hybrid training dataset that is made up of a combination of real and synthetic data.

Figure 5:
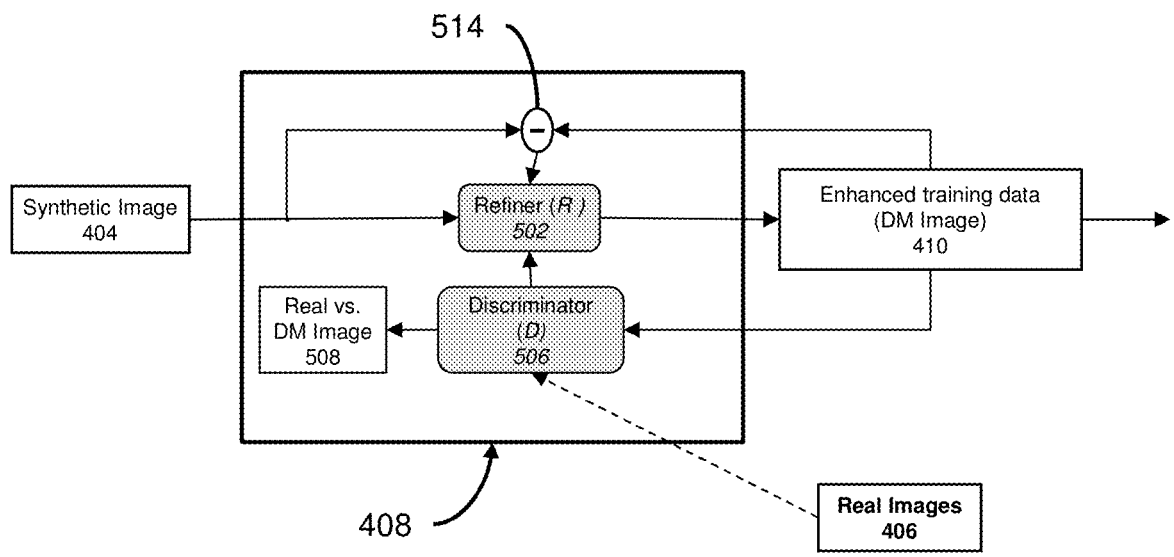
FIG. 5 shows a neural network of the system of FIG. 4 in accordance with the various aspects and embodiments of the invention.

In accordance with some aspects and embodiments of the invention, the refiner uses conditional generative models trained to make an image indistinguishable from a real image, as outline with respect to the refiner 502 of FIG. 5. In accordance with some aspects and embodiments of the invention, training such models requires only an unlabeled dataset of real images. Additionally, this dataset does not have to contain the exact object that the model of the system is intended to ultimately recognize. This greatly simplifies data collection needed for training the model.

Figure 3:
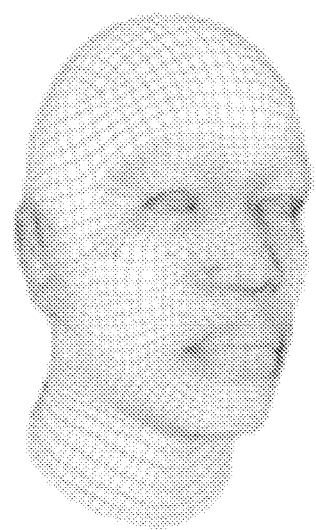
FIG. 3 shows various synthetic data generated for training a system in accordance with the various aspects and embodiments of the invention.
Figure 3:
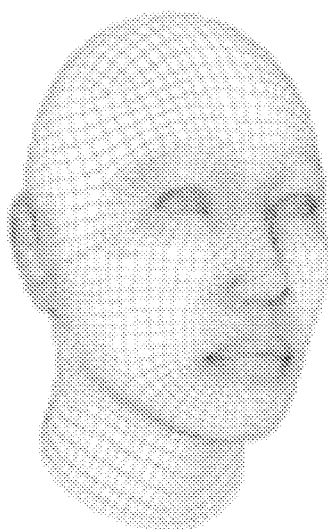
Figure 3:
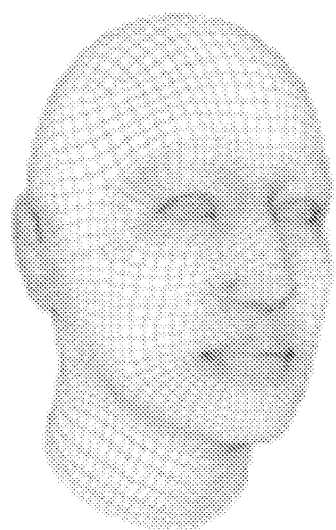

Referring now to FIG. 3, various 3D model generations of a face are shown, such as a face 300, a face 302, and a face 304. Each face shows a different facial feature used to generate the synthetic images for the training data. Through variations of the various parameters, additional training datasets are generated. Facial features in the face 300, for example, includes a brow ridge that is different from facial features in the face 302 and facial features in the face 304. Many other facial features of the faces can be varied, including eye size (large to small), width of chin (wide to thin), face (heavy to thin), nose (flat to pointed) (narrow to wide) (down to up), shape of mouth and lips (full to slim), etc. The face 300, the face 302, and the face 304 are shown using similar camera or vision angles.

In accordance with the various aspects and embodiments of the invention, the camera angle can be varied so that a face is presented or being seen from various angles or viewpoints to represent a 3-dimensional image. The system can generate additional synthetic data through variations of the camera angle or viewpoint angle.

Figure 4:
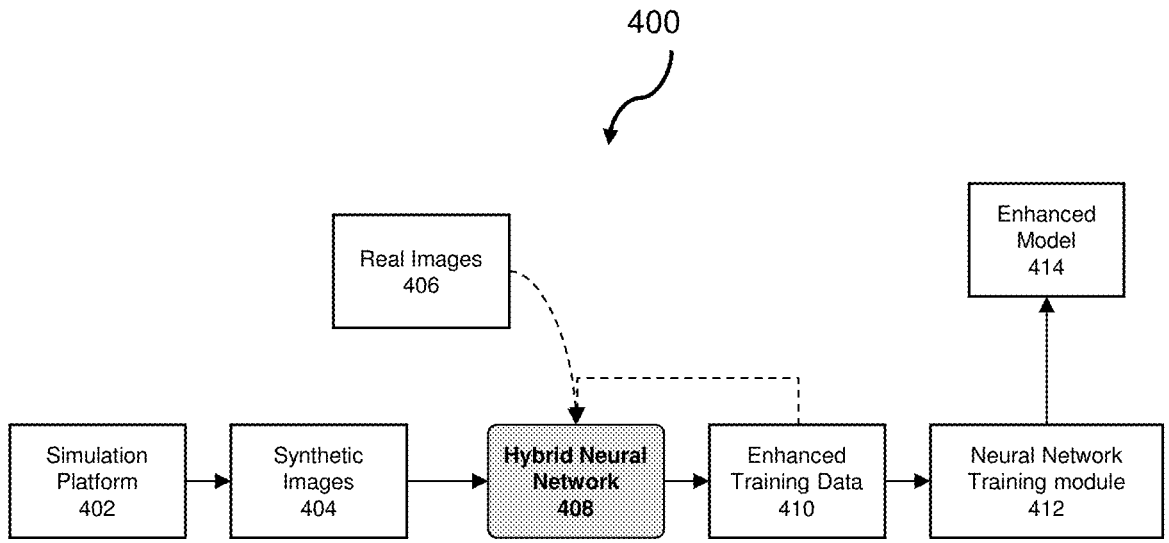
FIG. 4 shows a system for developing hybrid datasets using generative models (e.g., GANs) to refine synthetic data in accordance with the various aspects and embodiments of the invention.

Referring now to FIG. 4, a system 400 is shown for generating training datasets, which may include hybrid datasets with real data and synthetic data. The system 400 includes a simulation platform 402 that generates synthetic images 404. In accordance with one embodiment of the invention, the synthetic images 404 are combined with real images 406 by a hybrid neural network 408. In accordance with one embodiment of the invention, the training dataset is limited to synthetic images 404 that are provided to the network 408.

The network 408 generates enhanced training data 410 to provide a training dataset. The training dataset is used for further training the system 400 using the neural network training module 412 to produce an enhanced model 414.

Referring now to FIG. 5, the network 408 includes a refiner® 502 that receives the synthetic images 404. The refiner 502 is in communication with a discriminator (D) 506 and a comparator 514. Synthetic images 404 and enhanced training data 410 are provided as inputs to the comparator 514. The discriminator 506 and the comparator 514 provide inputs to the refiner 502. The refiner 502 generates the enhanced training data 410 that includes domain matched (DM) images. In accordance with one embodiment of the invention, the discriminator 506 receives the real images 406 and the enhanced training data 410 to provide an input to the refiner 502. The discriminator 506 also generates, as an output 508, information about of real images and DM images.

Figure 6A:
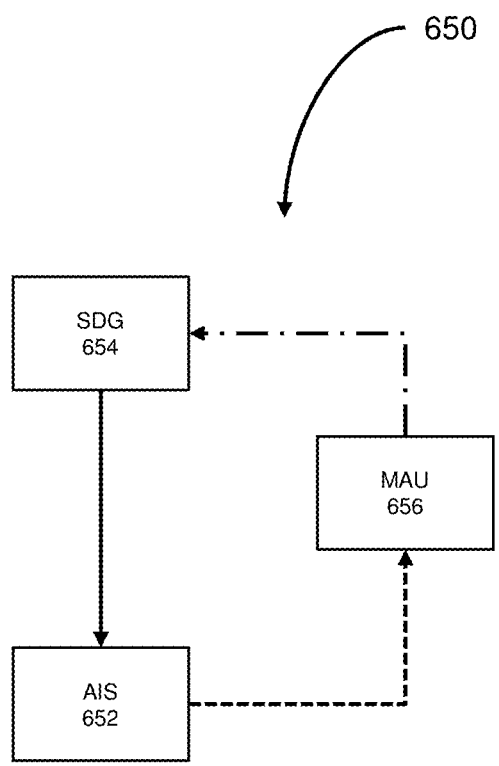
FIG. 6A shows a system using an adaptive process that changes based on the properties of obtained synthetic data in accordance with various aspects and embodiments of the invention.

Referring now to FIG. 6A, a system 650 is shown, in accordance with various aspects of the invention, that uses an adaptive process that changes based on the properties of obtained synthetic data. The system 650 includes: an AIS (computer vision model) 652 that is trained on a synthetic dataset, a synthetic data generator (SDG) 654 that has tunable parameters or some other way to change the generation process, and a model analyzer unit (MAU) 656 designed to process the final and/or intermediate outputs of the AIS 652 and establish what changes should be done to the parameter values or otherwise in the generation process in the SDG 654 in order to improve the quality (accuracy or other evaluation metric) of the AIS 652. The AIS 652. the SDG 654, and the MAU 656 are in communication using an automated feedback loop. In accordance with one aspect and embodiment of the invention, the SDG 654 begins to generate synthetic data with some default set of parameters/options. The resulting data is fed to the AIS 652. The system being training of the AIS 652. During training, the MAU 656 has access to the outputs of AIS 652 and intermediate outputs depending on the structure of the AIS 652, for example, the outputs of intermediate layers in a deep neural network. Based on this information and the quality metrics for AIS 652 measured on synthetic and/or real validation sets, the MAU 656 automatically determines what would constitute a favorable change in the parameter values or generation options for the SDG 654. The MAU 656 provides the information to the SDG 654. Then the values are changed and the SDG 654 begins generating a slightly different stream of synthetic data, thus closing the feedback loop. Then the process is repeated, which iteratively refines synthetic data, in order to improve the evaluation metrics produced by the AIS 652.

Figure 6B:
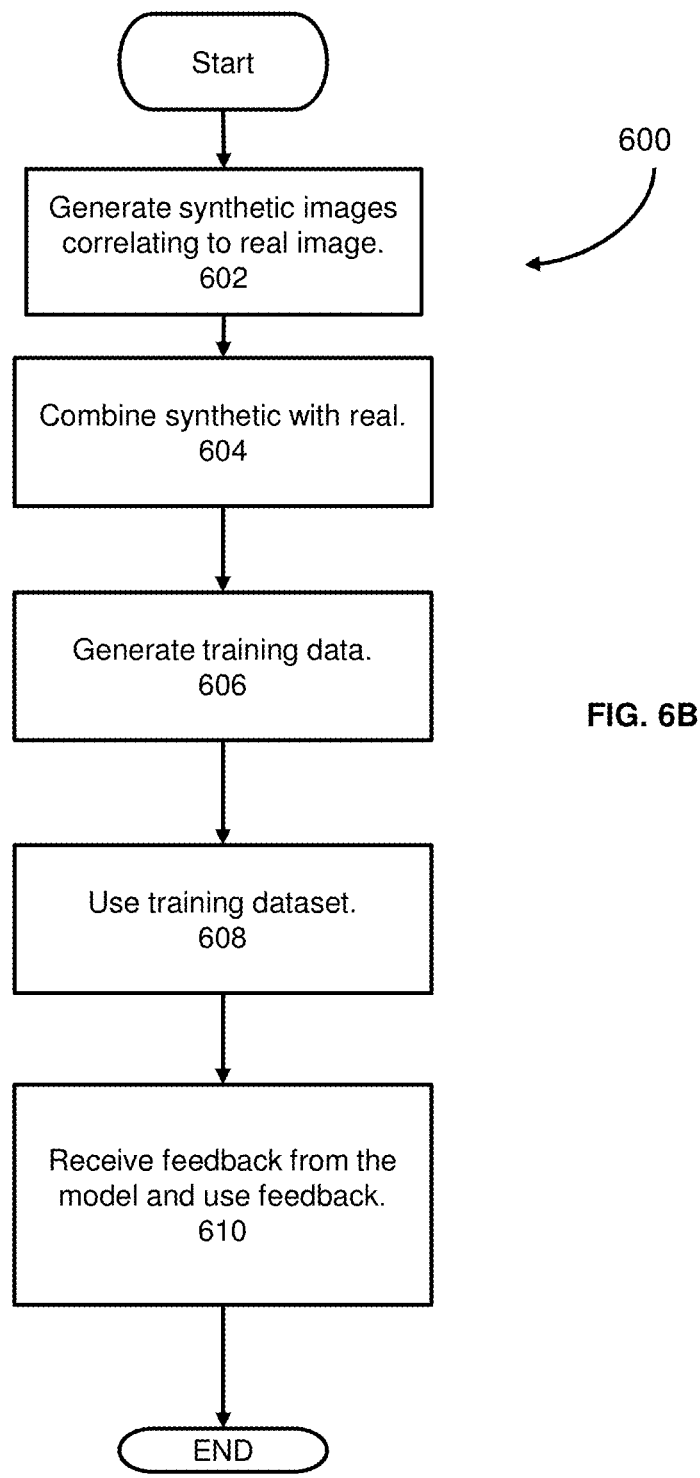
FIG. 6B shows a process for generating feedback on a training dataset in accordance with the various aspects and embodiments of the invention.

Referring now to FIG. 6B, a process 600 for receiving feedback is shown in accordance with the various aspects of the invention. At step 602 the system generates synthetic images (data) that mimic real images (data), as outline above. In accordance with one aspect of the invention, synthetic data can be enhanced with generative machine learning models. In accordance with an aspect of the invention, the synthetic data is prepared using computer graphics. In accordance with one aspect of the invention, the synthetic data is used to train a generative machine learning model, which in turn is used to make synthetic data (or images) more realistic. At step 604, the synthetic data is combined with real data. In accordance with an aspect of the invention, the system can train a model for visual recognition by using the synthetic data, which is enhanced by the generative model, with the training dataset. At step 606 the training dataset if generated. At step 608 the training dataset is used to train the model. The precision of the trained model can be tested on new data. In accordance with one aspect of the invention, the precision of the trained model is tested using new real data. In accordance with one aspect of the invention, the precision of the trained model is tested using new synthetic data. The testing process of the trained model can produce feedback, which the system can use to further refine and train the model. At step 610, the model provides feedback that is used to enhance, update or improve the training dataset, which is used to refine or further train and improve the model.

Figure 7:
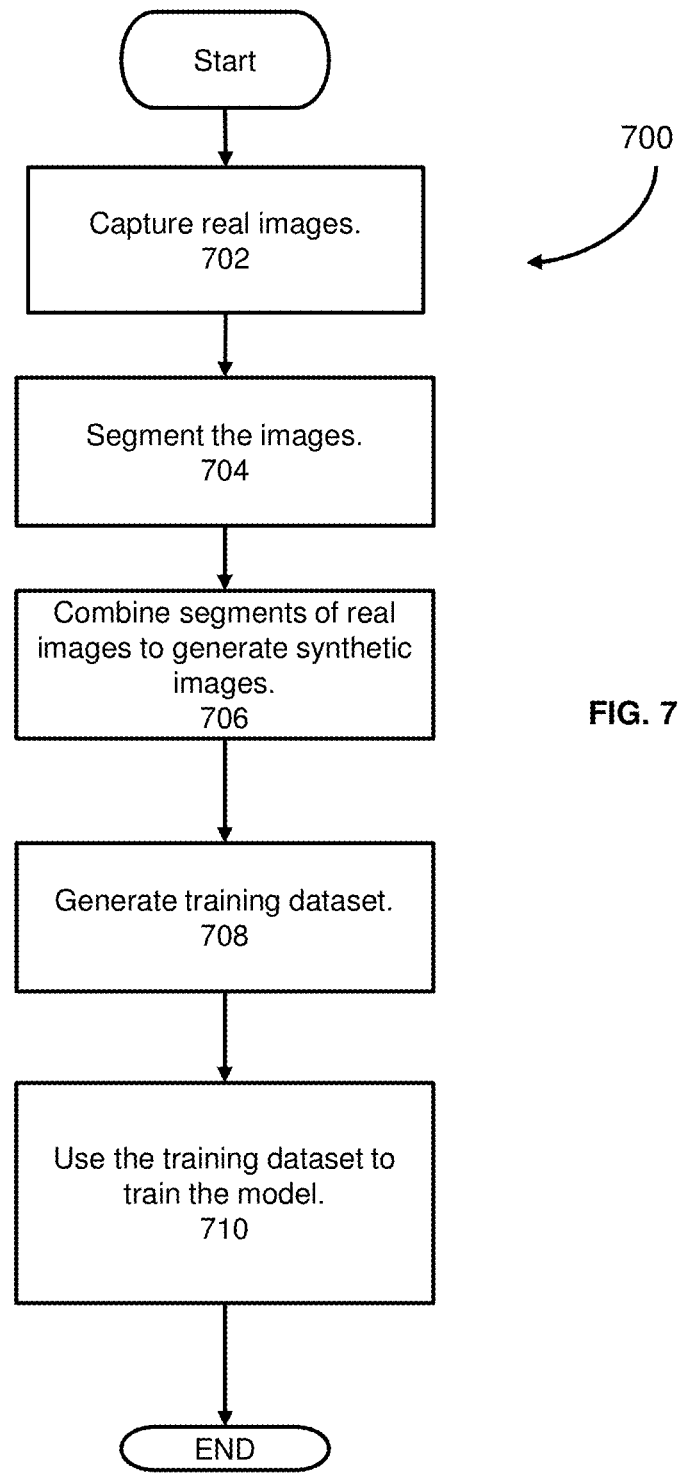
FIG. 7 shows a process for segmenting real images and combining the segmented images to generate synthetic image in accordance with the various aspects and embodiments of the invention.

Referring now to FIG. 7, a process 700 for combining real images to generate synthetic images is shown. The process 700 includes capturing real images at step 702. At step 704, the real images are segmented. The segmentation separates the different objects in the real image. At step 706 segments from different real images are combined to generate new synthetic images. Any number of new synthetic images can be generated based on the variation of combinations of the various segments of the real images. In accordance with one aspect of the invention, at step 708 a training dataset is generated using the generated synthetic images. In accordance with one aspect of the invention, the training dataset includes real images (captured and labelled) and synthetic images (generated and labelled). In accordance with one aspect of the invention, the training dataset includes only real images, wherein the real images are captured and labelled. In accordance with one aspect of the invention, the training dataset includes only synthetic images, which are labelled as outlined above. At step 710 the training dataset is used to train the model.

In accordance with various aspects and embodiments of the invention, the real image, which is segmented, is used to generate synthetic data by removing objects or portions of the real image. In this way, the absence of an object in the synthetic data can be used to further train the system or model. The synthetic data with a missing object is presented to the system. The response expected from the model would be an indication that the object, which is the subject to be detected by the model, is not present or missing. For example, a nose that is removed from a segmented image, which still includes other facial features, can be used to train the model to detect the absence or lack of a nose in the image. In this example and in accordance with one aspect of the invention, the image presented to the model may be an altered real image that is modified by removing the object (nose). In this example and in accordance with another aspect of the invention, the image presented to the model may be a synthetic data that is generated based on the real image.

In accordance with the various aspects of the invention, synthetic datasets are implemented for domain adaptation and domain transfer techniques for training of machine learning models. Domain adaptation is the problem of leveraging labeled data in a source domain to learn and train an accurate model in a target domain, wherein the labels are scarce or unavailable. In regard to using synthetic datasets, domain adaptation is applied to a machine learning model trained on one data distribution, which is a source domain (in this case, the domain of synthetic data), so that the model solves similar problems on a dataset of different nature, which is a target domain (in this case, the domain of real data). In accordance with one aspect of the invention, unsupervised domain adaptation is used when labeled data is available in the source domain and not in the target domain; the target domain has only unlabeled data available. In accordance with one aspect of the invention, the system applies unsupervised domain adaptation in situations where the source domain is the domain of synthetic data, which has abundant and diverse range of labeled data, and the target domain is the domain of real data, which includes a large dataset that may be unlabeled.

In accordance with aspects and embodiment of the invention, the system uses a generalized feature extractor model, where features of the source domain and target domain are made to be indistinguishable. Example of such models include: RevGrad model, Virtual Adversarial Domain Adaptation (VADA) model, and Decision-boundary Iterative Refinement Training with a Teacher (DIRT-T) model. In accordance with an aspect of the invention, training of the model is progressive. As the training progresses, features emerge that are discriminative for the source domain and indiscriminate with respect to the shift between the source and target domains. For example, the various aspects and embodiment of the invention includes a process that uses modification of domain adaptation VADA model and DIRT-T model by adding the source entropy maximization term to their respective loss functions. The system, using the synthetic dataset with the labels, learns a direct source-to-target transformation, such as an image-to-image translation, using generative models and domain adaptation frameworks based on generative models, such as SimGAN, CycleGAN, and Cycle-Consistent Adversarial Domain Adaptation (Cy-CADA). In accordance with aspects of the invention, the system provides an approach for unsupervised domain adaptation to the synthetic-to-real adaptation.

In accordance with the various aspects of the invention, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories or memory. Thus, in certain embodiments that are in accordance with any aspect of the invention, computer readable program code (or code) is encoded in a non-transitory computer readable medium of the computing device. As outlined herein, a processor or a module, in turn, executes the computer readable program code to create or amend an existing computer-aided design using a tool. The term "module" as used herein may refer to one or more circuits, components, registers, processors, software subroutines, or any combination thereof. In accordance with some aspects and embodiments of the invention, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements that, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Reference throughout this specification to "one embodiment," "an embodiment," or "in accordance with some aspects" and similar language means that a particular feature, structure, or characteristic described in connection with the various aspects and embodiments are included in at least one embodiment of the invention. Thus, appearances of the phrases "in accordance with an aspect," "in accordance with one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Therefore, the scope of the invention is not intended to be limited to the various aspects and embodiments discussed and described herein. Rather, the scope and spirit of the invention is embodied by the appended claims.

What is claimed is:

1. Method for training a system, the method comprising:
generating a plurality of synthetic images, wherein the synthetic images are produced from generative machine learning models, which include neural models;
combining the plurality of synthetic images with a plurality of real images to produce a training dataset, wherein the training dataset includes synthetic data that is generated based on any one of a plurality of attributes; and
providing the training dataset to the system to train the system to perform visual recognition.

2. The method of claim 1, wherein the generative machine learning models include deep learning (DL) models.

3. The method of claim 1, wherein the system includes statistical learning.

4. The method of claim 1 wherein the system includes a computer vision (CV) system.

5. The method of claim 1, wherein the system includes an artificial intelligence system (AIS).

6. The method of claim 1, wherein the step of generating includes procedural generation.

7. The method of claim 1, wherein the step of generating includes computer graphic techniques.

8. The method of claim 1 further comprising altering at least one parameter associated with a real object that is represent in any one real image selected from the plurality of real images to generate a new synthetic image.

9. The method of claim 8, wherein the at least one parameter includes altering at least one attribute selected from a group of attributes that includes environment, camera attribute, and scene information.

10. The method of claim 8, wherein the at least one parameter is based on presence of the real object with inanimate and animate features.

11. The method of claim 1, further comprising:
updating the training dataset; and
retraining the system using the updated training dataset.

12. The method of claim 1 further comprising the step of segmenting a real image selected from the plurality of images to generate a plurality of superpixels.

13. The method of claim 12 further comprising the steps of:
altering at least one superpixel of the segmented real image;
generating, using the altered superpixel of the segmented image, a new synthetic image.

14. The method of claim 12 further comprising analyzing a group of superpixels selected from the plurality of superpixels.

15. The method of claim 14 wherein the group of superpixels represent a facial feature.

16. The method of claim 14 wherein the group of superpixels represents an object in a real image, which is selected from the plurality of real images, wherein the object is a subject upon which the system is being trained.

17. A system for training a model, the system comprising:
a simulation platform; and
a hybrid neural network in communication with the simulation platform,
wherein synthetic images are generated by the simulation platform using a generative machine learning model, which includes neural models and deep learning models,
wherein the synthetic images and real images are inputted to the hybrid neural network, and
wherein the hybrid neural network generates an enhanced training dataset that is used to further train the model.

18. A method for improving training datasets, the method comprising:
generating at least one training dataset, wherein the training dataset includes synthetic images focused on a subject and produced using a generative machine learning model, which includes a deep learning model;
training a model focused on the subject using the training dataset;
testing the trained model using seed data;
generating feedback from the model based on testing; and
improving the training dataset based on the generated feedback.

19. The method of claim 18, wherein the training dataset is a hybrid dataset and includes real data and synthetic data.

* * * * *